US006993722B1

(12) United States Patent
Greer et al.

(10) Patent No.: US 6,993,722 B1
(45) Date of Patent: Jan. 31, 2006

(54) USER INTERFACE SYSTEM METHODS AND COMPUTER PROGRAM PRODUCTS FOR MULTI-FUNCTION CONSUMER ENTERTAINMENT APPLIANCES

(75) Inventors: Frank Greer, Greenville, SC (US);
Sean Priddy, Simpsonville, SC (US);
Rafael Heredia, Easley, SC (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/499,442

(22) Filed: Feb. 7, 2000

Related U.S. Application Data

(60) Provisional application No. 60/119,021, filed on Feb. 8, 1999.

(51) Int. Cl.
G11B 27/00 (2006.01)
G06F 3/00 (2006.01)

(52) U.S. Cl. .................. 715/739; 715/718; 715/738; 715/764; 725/59

(58) Field of Classification Search ................ 345/764, 345/765, 762, 854, 718, 743, 741, 742; 725/38, 725/59; 348/734, 705, 706, 552; 715/718, 715/738, 739, 764
See application file for complete search history.

(56) References Cited

U.S. PATENT DOCUMENTS 5,734,380 A * 3/1998 Adams et al. ............. 345/804
5,787,259 A * 7/1998 Haroun et al. ............ 709/253
5,815,631 A * 9/1998 Sugiyama et al. ............ 386/46
5,825,359 A * 10/1998 Derby et al. ............... 345/807
5,850,218 A * 12/1998 LaJoie et al. ................ 725/45
5,940,073 A * 8/1999 Klosterman et al. ........ 345/721
6,084,638 A * 7/2000 Hare et al. ................ 348/552
6,104,384 A * 8/2000 Moon et al. ............... 345/168
6,163,316 A * 12/2000 Killian ..................... 345/721
6,177,946 B1 * 1/2001 Sinclair et al. ............ 345/501
6,177,963 B1 * 1/2001 Foye et al. ................ 348/706
6,182,094 B1 * 1/2001 Humpleman ............... 707/513
6,204,837 B1 * 3/2001 Smith ........................ 345/157
6,204,884 B1 * 3/2001 Lee .......................... 348/555
6,208,388 B1 * 3/2001 Farleigh .................... 348/705
6,320,599 B1 * 11/2001 Sciammarella et al. ..... 345/667
6,359,636 B1 * 3/2002 Schindler et al. .......... 345/846
6,587,053 B1 * 7/2003 Lee ...................... 340/825.72

* cited by examiner

Primary Examiner—Ba Huynh
Assistant Examiner—Gary D. Nguyen
(74) Attorney, Agent, or Firm—Robert P. Bell; Steven Lin; Scott Thomas

(57) ABSTRACT

A user interface system, method and computer program product permits selection of predetermined device application modes in a television set system and checking the activation status of other application modes. If active modes are identified which are incompatible with the selected active mode, then these other active modes are halted. If compatible active modes are identified, then these remain concurrently active, with particularized adaptations being made. The user interface is particularly adapted for use with a set-top box environment using a TV set as a user display.

19 Claims, 14 Drawing Sheets

USER INTERFACE SYSTEM METHODS AND COMPUTER PROGRAM PRODUCTS FOR MULTI-FUNCTION CONSUMER ENTERTAINMENT APPLIANCES

CROSS-REFERENCE TO RELATED APPLICATIONS

The present application claims priority from Provisional U.S. Patent Application Ser. No. 60/119,021, filed on Feb. 8, 1999 and incorporated herein by reference in its entirety.

FIELD OF THE INVENTION

The present invention relates to user interface systems, methods, and computer program products, and more particularly to user interface systems, methods, and computer program products for multi-function consumer entertainment appliances such as for example a TV set-top box appliance. Such a TV set-top box appliance may incorporate a number of computer and entertainment features, including but not limited to, DVD player, internet radio player, e-mail access, internet web access, TV tuning, radio tuning, computer game playing, and the like.

BACKGROUND OF THE INVENTION

Graphic user interface (GUIs) known in the computer art and have even been applied to some consumer devices. Applying common GUIs directly to consumer entertainment appliances may, however, be disadvantageous, because the typical GUI is complex and may limit functionality of the appliance. In particular, consumer entertainment appliances using remote controls may be technologically challenged, because of the functional limitations of the typical GUI and the remote control which the user employs for selecting and modifying particular application programs and games.

For example, a Windows™ interface (Microsoft Corporation, Redmond Wash.) is typically designed to work in a monitor type environment, with the user sitting less than 2 to 3 feet from the monitor. Such an application runs at a fairly high resolution, using small fonts and would be difficult to adapt to lower resolution monitors such as NTSC television. Even if applied to a large, high resolution monitor, (e.g., HDTV or the like), such an application may be difficult to use in a television viewing environment where the user sits typically 10–20 feet away from the screen.

Moreover, in such an environment, the use of a mouse or keyboard may be awkward, clumsy, and inconvenient as a typical desk or flat surface may not be readily available in a living room environment. Using a keyboard or mouse on a coffee table is awkward and ergonomically incorrect. A typical television type remote control would be preferable for use in a television type environment (e.g., living room, bedroom, home theater, or the like).

It may be desirable, therefor, to maximize application functionalities for different modes and applications which a user may launch and switchably alternate in background and foreground during operation. For example, different applications or modes may have different video output requirements. When in the Windows environment, a user may <ALT TAB> between different applications. In such an environment, the same video output mode may be utilized without regard to whether the particular application would be optimized with a different video mode. Little regard is given to optimizing ancillary functionalities native to a particular application. Switching between applications is accomplished, but subject to the current functional modality without any attempt at functional optimization incident to the particular application.

In addition, it is not known in the Prior Art to check for resource conflicts in advance between a new application to be launched and applications which have already been launched. Moreover, resource conflicts between multiple applications are not known to be resolved automatically with launching of a conflicting application. Nor is it believed to be known in the art to switch between applications by simple actuation to produce a menu of applications followed by selection of a particular one of the applications from the menu.

Similarly, it is not believed to be known in the art to respond automatically to a physical condition subject to active menu production and application selection with the launching of a second application if it is not already active in the background while being engaged with a first application, accompanied by switching from the first to the second application automatically, accompanied by an environmental context change associated with the second application.

For example, in a Windows™ environment, the possible conflicts between various programs and between various hardware types are almost endless, due to the constantly increasing number of software programs and hardware devices available for use in a computer system. If a user attempts to launch an application or use a hardware device which causes a conflict with another application or hardware device, the end result may be an error message, such as a general protection fault. For a typical consumer, such error messages are confusing and frustrating. Moreover, when such errors occur, oftentimes, data may be lost, the system may lock up, or an application must be closed manually.

A typical consumer is more familiar with a standard television (TV) interface than with computer systems and their interfaces. The typical consumer is familiar with remote controls for selecting TV channel and changing the audio volume of the TV and controlling other TV parameters, as well as using such controls for VCRs, DVD players, cable set-top boxes, stereo equipment, and the like.

Moreover, systems utilizing television interfaces to access the internet are known in the art. An example of such a system is the WebTV™ box which is licensed sold under a variety of brand names. Using a fairly simple user interface, the WebTV box allows a user to send and receive e-mail as well as access internet web sites. However, further applications of the WebTV box are fairly limited.

Set-top boxes are increasingly being configured with adaptations of Windows operating systems, (e.g., Windows CE). However, an unsophisticated TV viewer confronted with such a Windows interface may find it not very consumer-oriented, user-friendly, or operationally intuitive. The typical consumer user may prefer a simple, friendly presentation of set-top choices and parameters, not an entire panoply of Windows operating system interface complexities.

Further, if a set-top box is connected to selected information sources and appliances such as a telephone, a game device, the world wide web, TV, digital video disk (DVD) equipment, then it is desirable to provide the consumer user with a simple, particularized user interface scheme directed to all or selected ones of the connections, sources, and modes coupled into the set-top box, without the distraction of a generalized, unspecific and unduly technical user interface imported from the computer arts and not designed specifically for integrated multimedia applications.

Prior Art multi-function remote control devices are also known in the art. For example a television remote control device may be configured to operate VCR, DVD, Surround-Sound, or other devices. Alternately, a so-called "universal" remote control device may be provided to active a number of different infrared remote controlled consumer devices. However, in most instances, such remote controls must be programmed to be compatible with the make, model, and type of device to be controlled, or must "learn" such control signals by inputting signals from the manufacturer-supplied control for such a device.

Moreover, once programmed, such remote controls often require a two-step control function in order to operate. In order to control a particular device, a button must first be pressed indicating which device is to be controlled, and then a second button pressed indicating the command for the device. The universal remote then sends an infrared signal for the particular type of device selected and the command requested. The intelligence for such a feature resides in the remote. The separate consumer devices have no means by which they can determine context-sensitivity of a control signal.

SUMMARY OF THE INVENTION

A user interface provides the functionality and concurrency capability of a computer, without the complexities of a computer operating system, applications and hardware. The present invention permits use of a computer while maximizing a particular selected functionality. In particular, computer application grouping and launching facility on a user interface is maintained and supplemented with detection of resource conflicts with an earlier launched application, followed by user prompt requesting choice of implementation of the new or preceding application.

Since only a limited number of applications are run on the device, it is possible to map in advance which devices or applications will conflict with one another and prevent a user from running conflicting applications, and thus avoid cryptic error messages.

Thus, for example, if a speakerphone/telephony application is launched and the web is already running, a prompt to select one or the other of the applications is produced only in the case where there is a resource conflict. If a DVD application is launched and there is input from a TV tuner, the prompt to select one or the other of the applications is produced only in the case where there is a resource conflict. Further, the user interface may be configured to provide enhanced hardware utilization according to a launched application.

For example, when DVD is launched, a check is made to determine whether a TV has been connected. If a TV is connected, then the user interface will automatically select special hardware in a video-out chip to engage alternate video ports to produce a better quality output. If no TV is connected when DVD has been launched, the user interface automatically switches back to standard VGA mode to enable re-display of the user interface.

The user interface may be configured to enable user switching between currently operating applications and to launch new applications. Running applications may be selected for viewing with activation of a mouse button, by first activating a menu and then making a desired menu selection of the chosen application which is already running.

When one application is running and a third party signals a desire to operate with a second application, the user of the first application may select a menu and the second application, which, if already loaded and running in background, is switched to the foreground and, if not already running, is launched. When a DVD application is running and a third party calls by telephone, the user of the DVD application may select a menu and the telephony application, which if already loaded and running in background is switched to the foreground, and, if not already running, is launched.

The user interface may comprise a context manager which is aware of the run status of all applications and is able to facilitate switching between applications. A switching sequence between applications may be reversible, by actuation of the menu and selecting the originally run application, which has either been terminated or is running in background. If the original application has been terminated, then it may be automatically re-launched. If the application has been running in background, it may be switched to foreground by menu selection.

Particular video ports and associated operational modes relating to particular applications may be automatically connected and implemented with selection of a corresponding application on the menu. Particular video ports for an associated DVD movie hi-resolution video-out mode may be automatically switched off and video ports for VGA mode may be automatically connected and implemented with selection of a corresponding application on the menu. After the user has completed operation with the corresponding application, the menu may again be selected and the original application with the ancillary video-out mode may be reestablished to permit a user to continue watching the movie which was earlier playing.

Ancillary characteristics, mappings, and modes associated with particular switched applications may be automatically switched and instituted with activation by menu of new or alternate applications. Thus, a remote control working with a user interface permits automatic picking up of ancillary characteristics, modes, and mappings associated with an application.

Particular remote functions may be mapped to associated application functions automatically, by menu selection of an application, subject to a dependency on which application is running in the foreground. In particular, remote control functions such as fast forward, stop, play, and rewind may be identified with corresponding application functions such as, for example, DVD or CD function, subject to a dependency on which application is running in the foreground. Further, by selection of the DVD application, the fast forward, stop, play, and rewind functions of the remote control may be mapped and applied to operate associated functions on a DVD player, subject to a dependency on which application is running in the foreground.

Remote control commands may be dependent upon which application is the foreground application. The user interface may sense a button has been pressed such as the numeral 1, and, if a telephony application is the foreground application, then the numeral 1 is dialed. If DVD is the foreground application running, the first chapter of the movie may be loaded. If a CD audio player is playing a music disc, then the first track may loaded. In each case, operation takes place automatically by the user interface without the user having to press a particular button on the remote to enable a function change.

DETAILED DESCRIPTION OF THE INVENTION

Figure 1A:
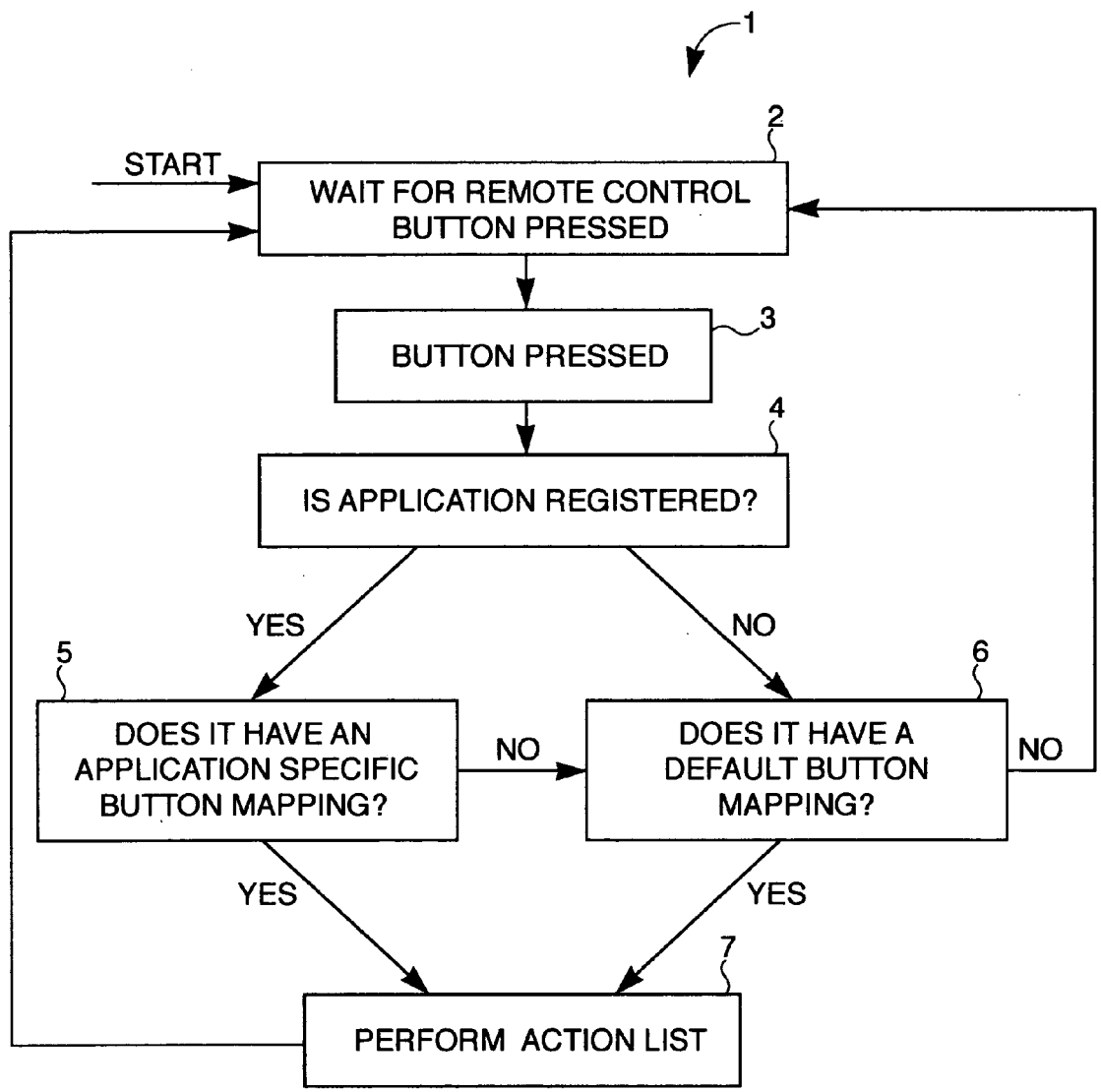
FIG. 1A is a flow chart of a remote control launch functional diagram according to the present invention.

FIG. 1A is a functional diagram of a remote control launch (RCL) program 1. Although discussed here in terms of a program. RCL program 1 may be implemented as software, hardware, firmware, or a combination of such elements. Thus, for example, RCL program 1 may be implemented as a software program running within or in conjunction with Windows™ software. In another embodiment, an infrared to USB interface may be provided as a hardware/firmware package to capture infrared control signals from a remote control and convert those signals to USB commands. This USB interface may receive commands from an infrared remote control and convert them into USB command signals to control a device in the system, depending upon the context sensitivity of the control signal.

RCL program 1 is an implementation of a user interface, which intelligently re-maps functions of a remote control based on which active application is operating in the foreground. Re-mapping is accomplished automatically without requiring a user to select a desired functionality from a remote or to switch devices using special function keys, as is typical on universal remotes.

In particular, once RCL program 1 has been started, a waiting period 2 may initiated in anticipation of a remote control button being pressed. Next, remote button may be pressed in step 3 by a user. Once RCL method 1 is implemented as a running program, all remote control button presses are captured. After a remote button has been pressed in step 3, RCL method 1 wakes up and goes through a number of steps to process the button message including a check undertaken in step 4 to determine whether an application indicated by the pressed button is registered with RCL program 1.

A registered application may be defined as an application which RCL method 1 may determine is active or running in the background. Since in a set-top environment, only a limited number of applications may be run (e.g., telephone, DVD player, e-mail, web access, netradio, or the like), it may be possible to list the finite number of possible applications running on the device.

If the application has been registered, then a check is undertaken in step 5 to determine whether the button has been provided with an application specific button mapping. In order to use a button map, it may be necessary to know what application is active and which button is pressed to determine the correct action list to call.

The mapping to determine which action list to execute is as follows: (Application, Button)-> Action List. If the application has not been registered, then a check is undertaken in step 6 to determine whether the button has been provided with a default button mapping. If the application has no default button mapping, then control returns to wait state 2 to wait for another remote control button to be pressed.

If the application has an application specific button mapping or default button mapping from either step 5 or step 6, the associated action list is performed in step 7. The action list is a predetermined sequence of list of actions. An action is a keystroke, for example, which sends a message to a window for example or directing the accessing of the video ports, by way of another example.

An action list is an ordered list of separate actions executed in a specific order. For each button pressed in step 3, there may be one or more individual actions performed. For example, when the PLAY button is pressed, the program may send a keystroke to the application to press the PLAY button. Then, the program implementing RCL program 1 may send a message to the video port to switch display modes to interlaced video. Finally, it may send a message to the video port to overlay the PLAY bitmap on the screen. One button press causes three separate actions to be performed according to one embodiment of the present invention. Once the action list is completed, control returns to waiting step 2 to wait for a remote control button to be pressed.

The program implementing RCL program 1 may use a remote control menu button to display the user interface. Once the user interface is displayed, the user may launch any registered application, return to a running registered application, or switch to any running application by using the remote control. The user interface is generally displayed unless the user selects the PC button which hides the custom user interface and thereupon displays a standard Windows™ desktop.

Figure 1B:
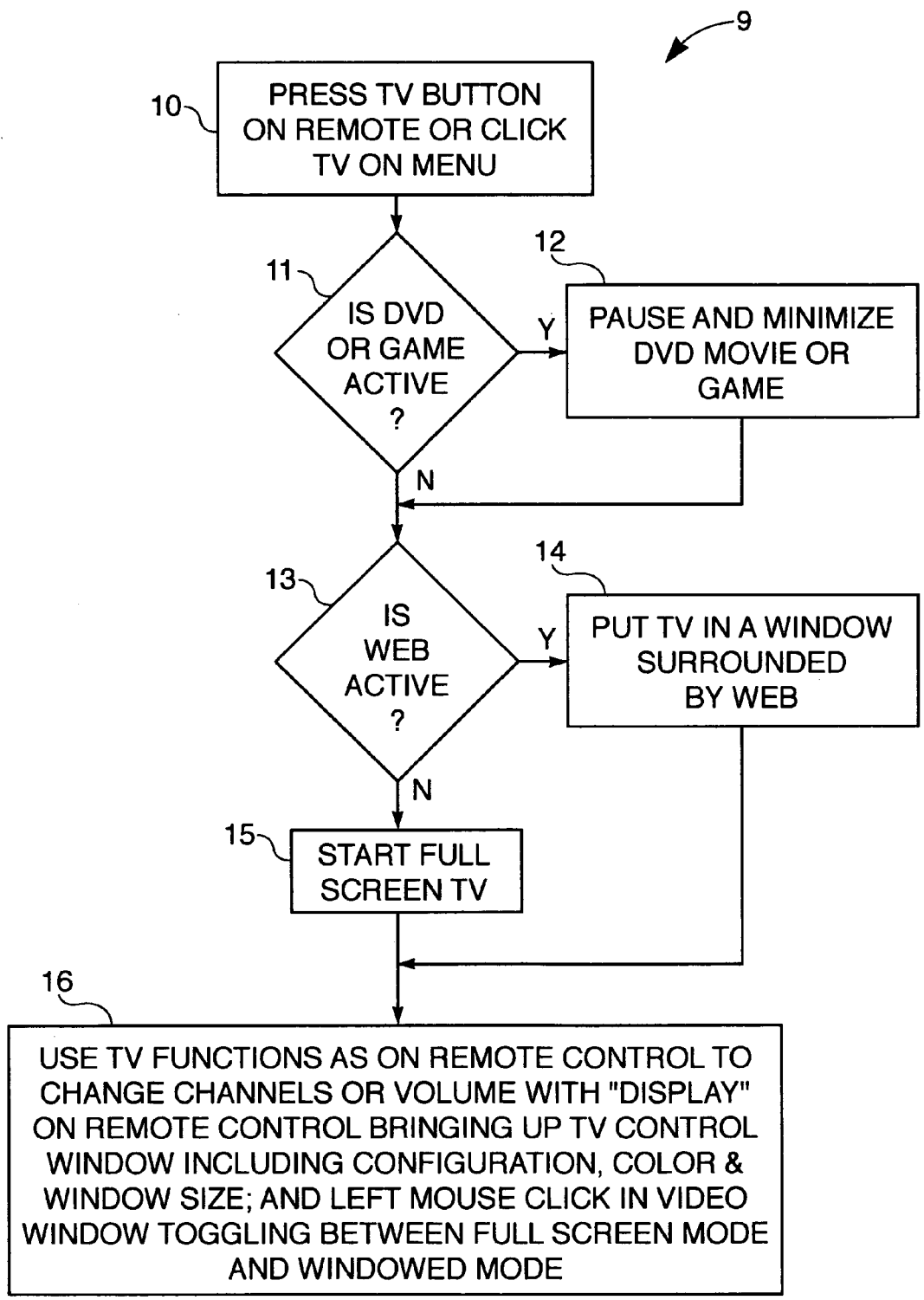
FIG. 1B is a flow chart of a multimedia set-top mode selection method in which a television (TV) mode is selected followed by mode status checks resulting in deactivation of any active digital video disk or game operations and in an interface style reformatting operation if the web mode is currently active.

FIG. 1B is a flow chart of a multimedia mode method 9 in which an active television mode may be selected, followed by various active status checks. If digital video disk or game processes are active, these process modes may be halted, (e.g., paused and minimized). The TV image may be further subordinated within a web browser framework if the web mode is currently active. Predetermined TV functions may be displayed in a remote control analogy to enable direct user implementation of volume and channel changes with a control window expressing choices of configuration, color, and window size.

In particular, according to multimedia mode method 9, a user may press, in step 10, TV mode button or menu using a remote control (RC) input device to set-top box of a television connected to the set-top box. Alternatively, a user may click on a TV field in a main menu of a user interface in which an emulation of a remote control input device may be presented on the TV screen. Next, a check may be made in step 11 to determine whether a digital video disk (DVD) player connected to the set-top box is active, or whether a game mode is active in the multimedia system. If a game or DVD operation is underway, the associated movie or game may be recognized as being active and may be paused and minimized in step 12 on the interface display, causing operations to halt.

Next, a check may be made in step 13 as to whether internet communications are currently active. If such a communication is underway, a TV image representation may be produced in step 14 in a window of predetermined size within a web browser representation on the TV screen. If the web mode is not currently active, presentation of a full screen TV image may be initiated in step 15 without browser subordination. In such a TV mode of operation, conventional TV functions may be used in step 16 with a remote control (RC) input device or its screen emulation to change channels or volume.

For example, the TV display may bring up a TV control window having configuration, color, and window size control fields which may be mouse or keyboard selected. A mouse image control field may be produced in the TV control window which includes a left mouse button field on which a cursor indicated click will produce video window toggling between full screen and windowed modes.

Figure 1C:
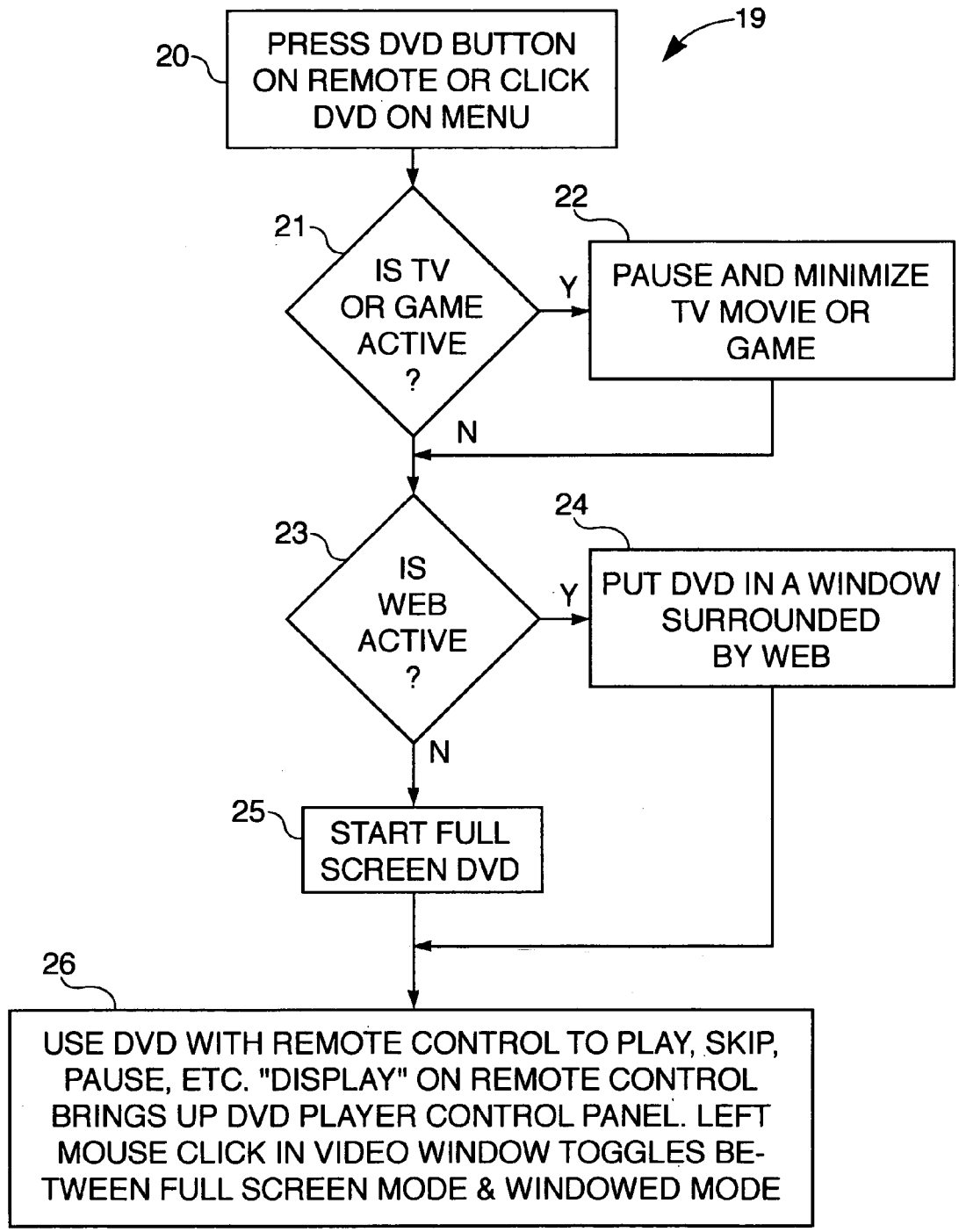
FIG. 1C is a flow chart of a multimedia mode selection method in which a digital video disk (DVD) mode is selected followed by mode status checks resulting in deactivation of any active TV or game operations and in a interface style reformatting operation if the web mode is currently active.

FIG. 1C is a flow chart of a multimedia mode method 19 in which digital video disk mode is selected followed by various active status modes checks. If applicable, deactivation of TV or game processes follows, including subordination of DVD images within a web frame work if the web is active. DVD functions may be displayed in emulation of a remote control to implement play, skip, and pause activities in a similar manner as is presented on a DVD player control panel.

In step 20, a user may press the digital disk (DVD) button on a remote control (RC) input device. Alternatively, the user clicks on the DVD field in a main menu of a user interface. Next, a check is made in step 21 to determine whether a TV or a game mode is active on the multimedia system. If TV operation or a game is currently underway, the TV program or game may be paused and minimized (e.g., halted) on the interface display in step 22. Next, a check is made in step 23 as to whether internet communications are currently active. If such communication is underway, a DVD image representation may be made in a window within a web browser representation may be initiated in step 24 on the TV display.

If the TV mode is currently active, particular TV channels may be selectable on a presented control image having channel up and down keys and pound (#) keys. Forward and reverse keys may be activated on a DVD controller image to move backward and forward through a DVD program as illustrated in step 26. A mouse image may be use to navigate over control images and to select play and disconnect options. A remote control display image brings up web size option fields including full screen, background, and ticker format options. Upon detection of incoming mail, a mail icon may pop up on the screen. Clicking on the icon or pressing the web field will cause received mail to pop up. Clicking on the right mouse button removes the mail icon produced in a window within the web browser representation on the TV screen.

If the web is not currently active, a full screen DVD image may be initiated in step 25 on the TV display. In this DVD mode of operation, the external remote control image device or its screen image representation with associated active fields on a DVD player control panel permits actuation of play, skip, and pause functions to be actuated, as illustrated in step 26. A mouse image control field may be produced in the TV control window which represents a left mouse button field on which a cursor indicated check will cause video window toggling between full screen and windowed modes.

Figure 1D:
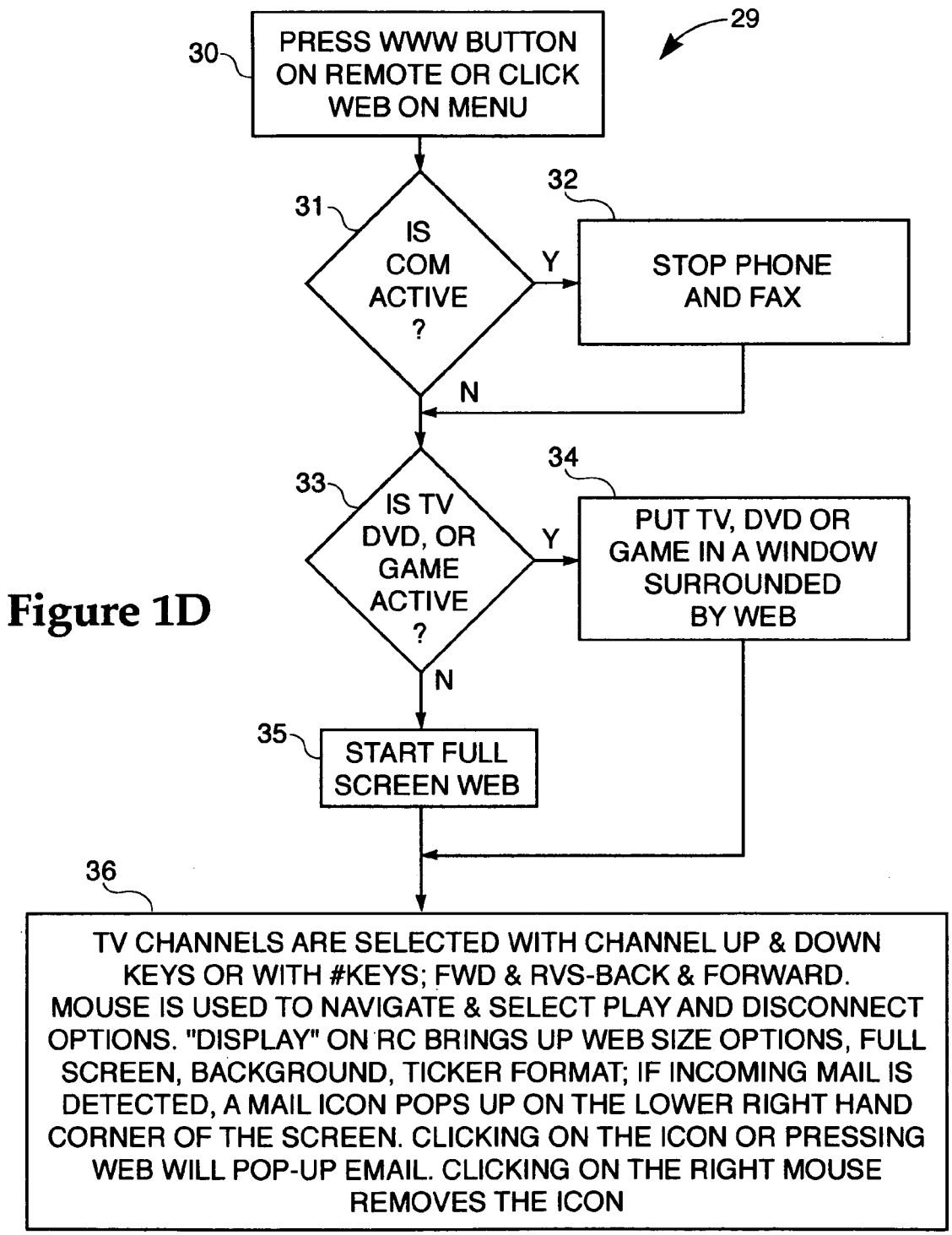
FIG. 1D is a flow chart of a multimedia set-top selection method in which a world wide web mode is selected followed by mode status checks resulting in deactivation of any active digital video disk, TV, or game operations and in an interface style reformatting operation if the web mode is currently active.

FIG. 1D is a flow chart of multimedia mode method 29 in which world wide web mode may be selected, followed by various status checks and, if applicable, deactivation of communication functions including telephone and facsimile transmission, and subordination of an TV, DVD, or game images in a window surrounded by web, wherein TV channels, game commands and activities, and DVD settings are intuitively controllable, web size options are settable and mail delivered over the web may be detected and announced with appearance of a removable mail icon.

In step 30, a user may press a world wide web button on a remote control (RC) input device to a set-top box of a television connected to the set-top box, or click on the world wide web field in a main menu of a user interface. Next, a check is made in step 31 to determine whether a communication mode may be active on the multimedia system. If the communication mode is active, telephone and facsimile operation may be terminated in step 32.

Next, a check is made in step 33 to determine whether a TV, DVD, or game mode may be active. If any such a mode is found to active, the particular mode visual representation may be produced in a window within a web browser representation on the TV screen. If no such a mode is active, a full screen web browser representation may be initiated in step 35 on the TV display.

In step 36, if the TV mode is active, particular TV channels may be selectable on a presented control image having channel up and down keys and pound (#) keys. Forward and reverse keys may be actuated on a DVD controller image to move backward and forward. A mouse image may be used to navigate over control images and to select play and disconnect options. A remote control display image brings up web site option fields including full screen, background, and ticker format options. Upon detection of incoming mail, a mail icon may pop up on the screen.

Clicking on the icon or pressing the web field will cause received mail to pop up. Clicking on the right mouse button may remove the mail icon.

Figure 1E:
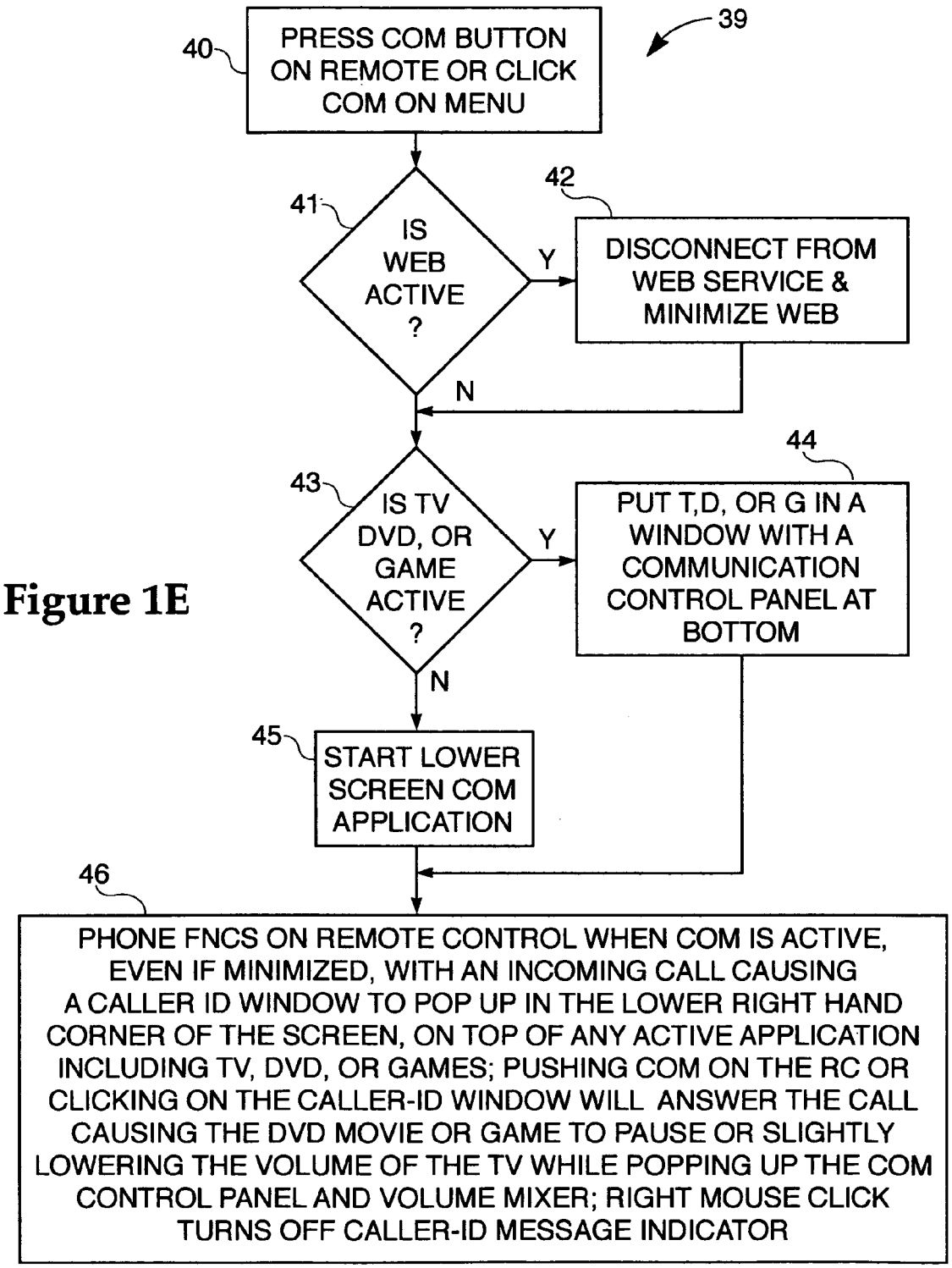
FIG. 1E is a flow chart of a multimedia set-top mode selection method in which communication mode is selected followed by mode status checks resulting in deactivation of any active digital video disk, TV, or game operations and in an interface style reformatting operation if the web mode is currently active.

FIG. 1E is a flow chart of multimedia mode method 39 in which communication mode is selected, followed by various active status checks and, if applicable, deactivation of the web. If a TV, DVD, or a game mode is active, the associated image or images may be placed in a window having an associated communication control panel, enabling caller ID, call answering, and related function activation by the user. In step 40, a user may press a communication button on a remote control (RC) input device to a set-top box of a television connected to the set-top box, or click on the communication field in a main menu of a user interface.

A check is made in step 41 whether a web mode is active on the multimedia system. If the web mode is active, it is disconnected from service in step 42 and the web browser representation is minimized. Next, a check is made in step 43 whether a TV, DVD, or game mode is active. If any such mode is found to be active, the particular associated mode visual representation is produced in a window representation on the TV screen in step 44, with a communication control expressed at the bottom of each such particular window. If no such a mode is active, a lower screen communication application representation is started in step 45.

Such a representation includes fields expressing predetermined telephone functions on a remote control as illustrated in step 46. An incoming call during activation of the COM mode causes a called ID window to pop up in the lower right hand corner of the screen on top of any other active applicants including TV, DVD or game mode displays. Pushing the COM button on a remote control input device or clicking on the caller ID window of the remote control representation image may result in the incoming call being answered, causing any DVD movie or game operation to pause, or lowering TV volume while popping up the COM controller panel and volume mixer images. The right mouse button, when clicked may cause a caller ID message indicator to be turned off.

Figure 1F:
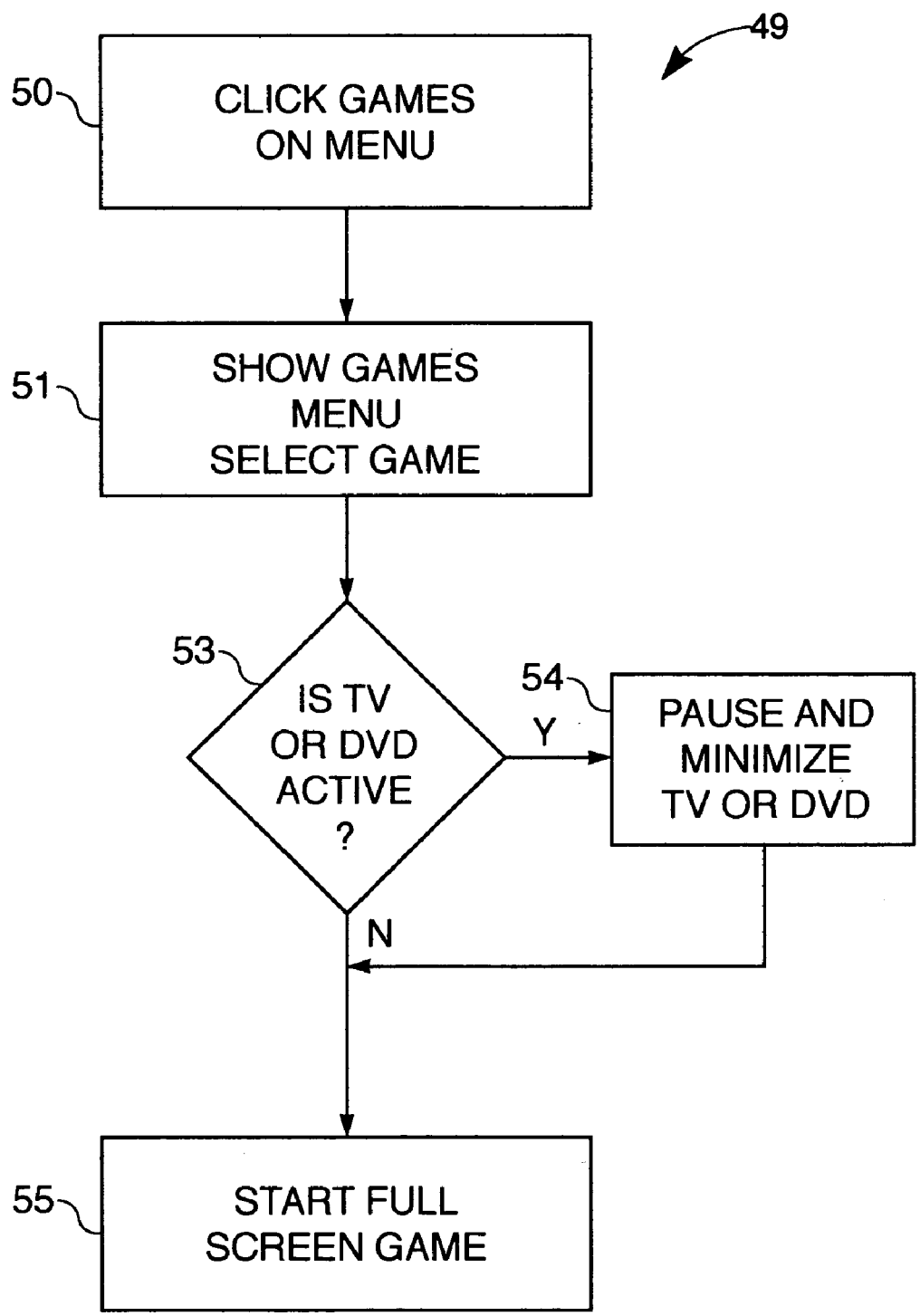
FIG. 1F is a flow chart of a multimedia mode selection method in which game mode is selected followed by active mode status checks to determine whether digital video disk or TV processes are active, and the showing of a games menu to permit selection of a particular game followed by initiation of a full screen game.

FIG. 1F is a flow chart of a multimedia mode method 49 in which a game mode is selected followed by various active status checks, and if applicable, deactivation of digital video disk or TV process modes and the showing of games menu to permit selection of a particular game followed by initiation of a full screen game. In step 50, a user may press a games button on a remote control (RC) input device to a set-top box of a television connected to the set-top box, or clicks on the games field in a main menu of a user interface. In response, the games menu may be shown in step 51 and the user may then select a particular game.

Next, a check is made in step 53 whether the TV or the DVD mode is active. If either such mode is active, the particular activity is paused and minimized in step 54. If neither mode is active, a full screen game image may be presented on the TV screen in step 55.

Figure 1G:
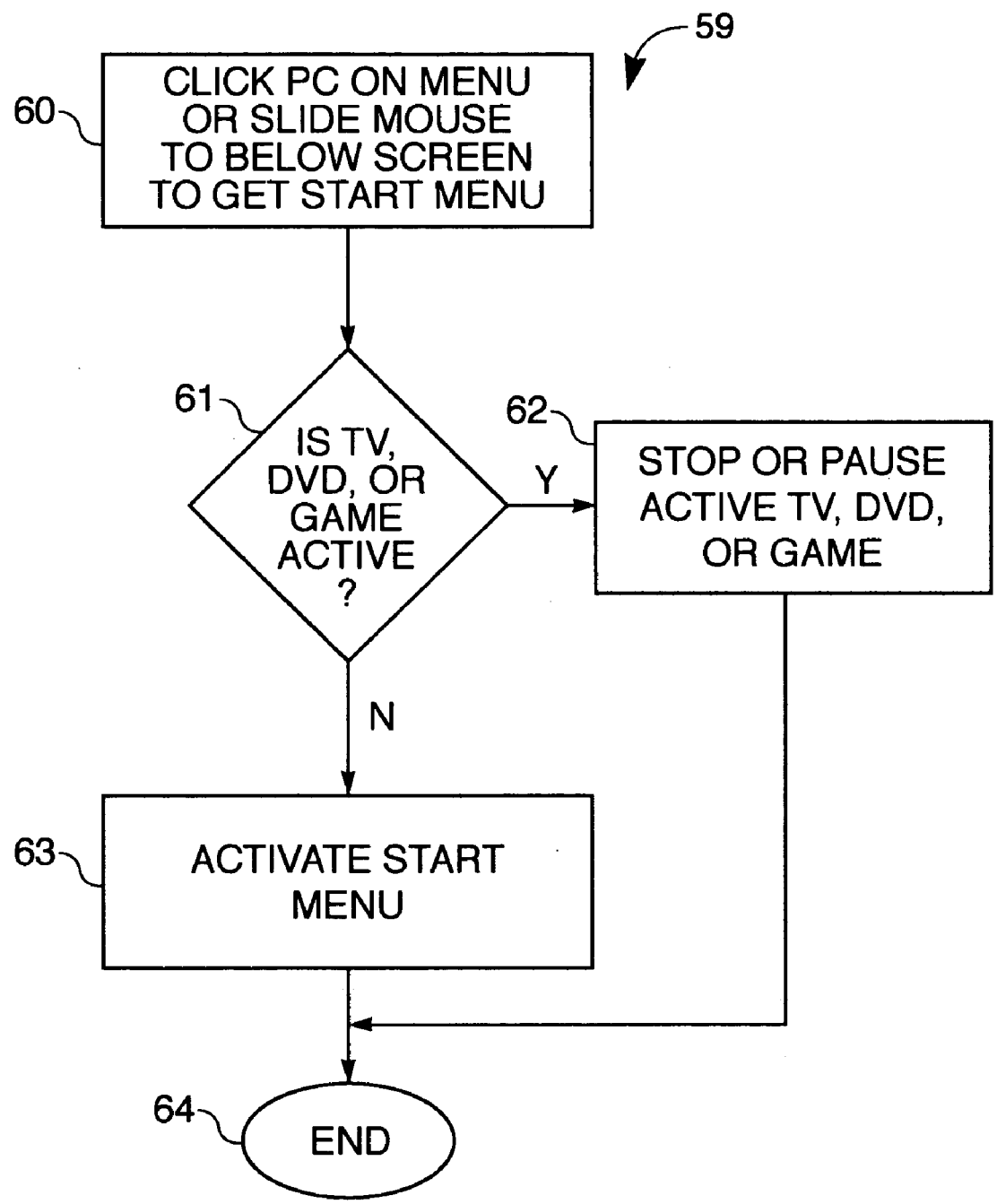
FIG. 1G is a flow chart of a multimedia mode selection method in which a PC mode is selected followed by various active status checks, and, if applicable, deactivation of TV, digital video disk, or game processes, followed by activation of a PC start menu.

FIG. 1G is a flow chart of a multimedia mode method 59 in which a personal computer (PC) mode may be selected followed by various active status mode checks and, if applicable, deactivation of TV, digital video disk, or games processes, followed by activation of a PC start menu. In step 60, a user may press a personal computer (PC) button on a remote control (RC) input device to a set-top box of a television connected to the set-top box, or clicks on the PC field in a main menu of a user interface.

Next, a check is made in step 61 whether a TV, DVD, or game mode is active. If such a particular mode activity is found to be active, the particular identified activities may be stopped or paused in step 62. If no such activity is identified as active, the start menu may be activated in step 63. Thereafter, operation is ended in step 64.

Figure 1H:
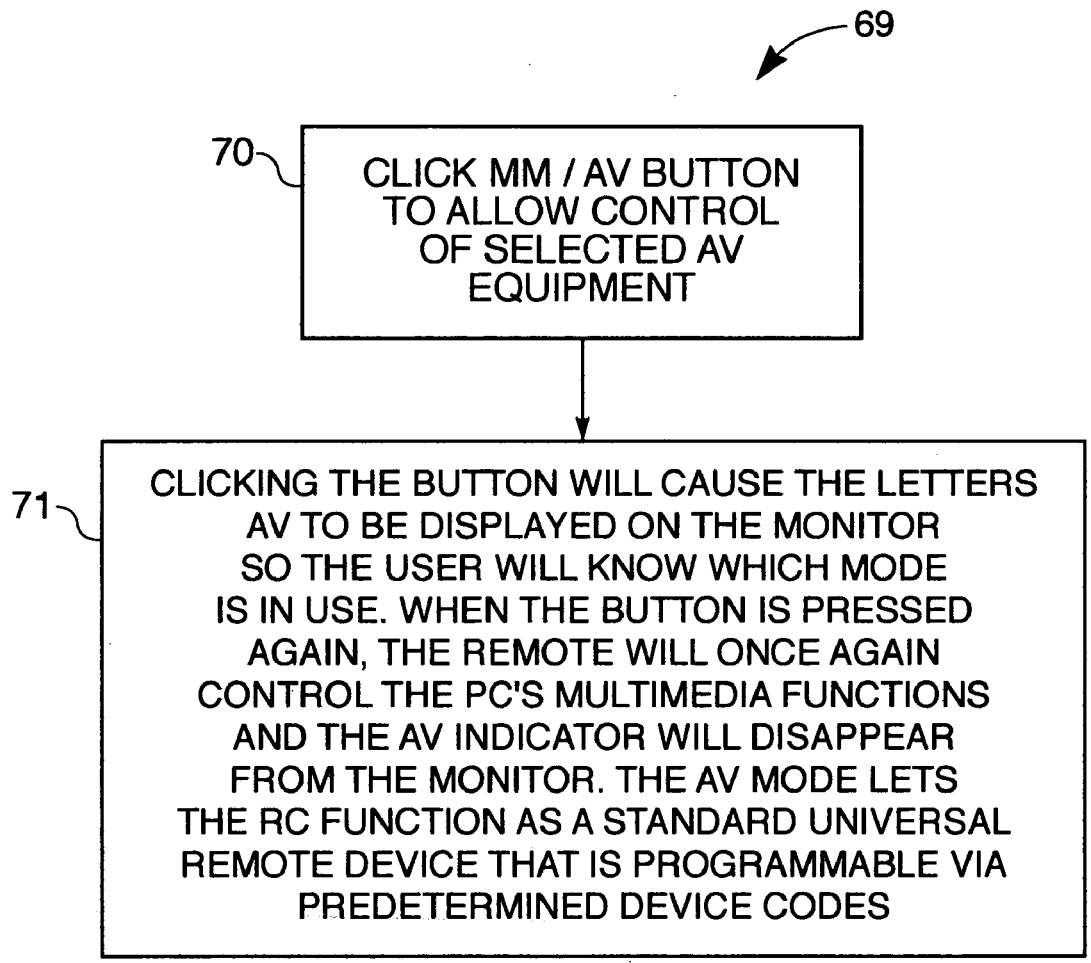
FIG. 1H is a flow chart of a multimedia mode selection method in which multimedia and audiovisual modes are separately selectable.

FIG. 1H is a flow chart of a method 69 in which multimedia and audiovisual modes are selectable. In step 70, a user may press a multimedia audio visual (MM/AV) button to permit predetermined control of selected multimedia equipment. Clicking the button in step 71 may cause the letters AV to be displayed on the monitor, so the user will identify the current mode of operation. Clicking again will put the remote in control of predetermined PC multimedia functions.

Figure 2A:
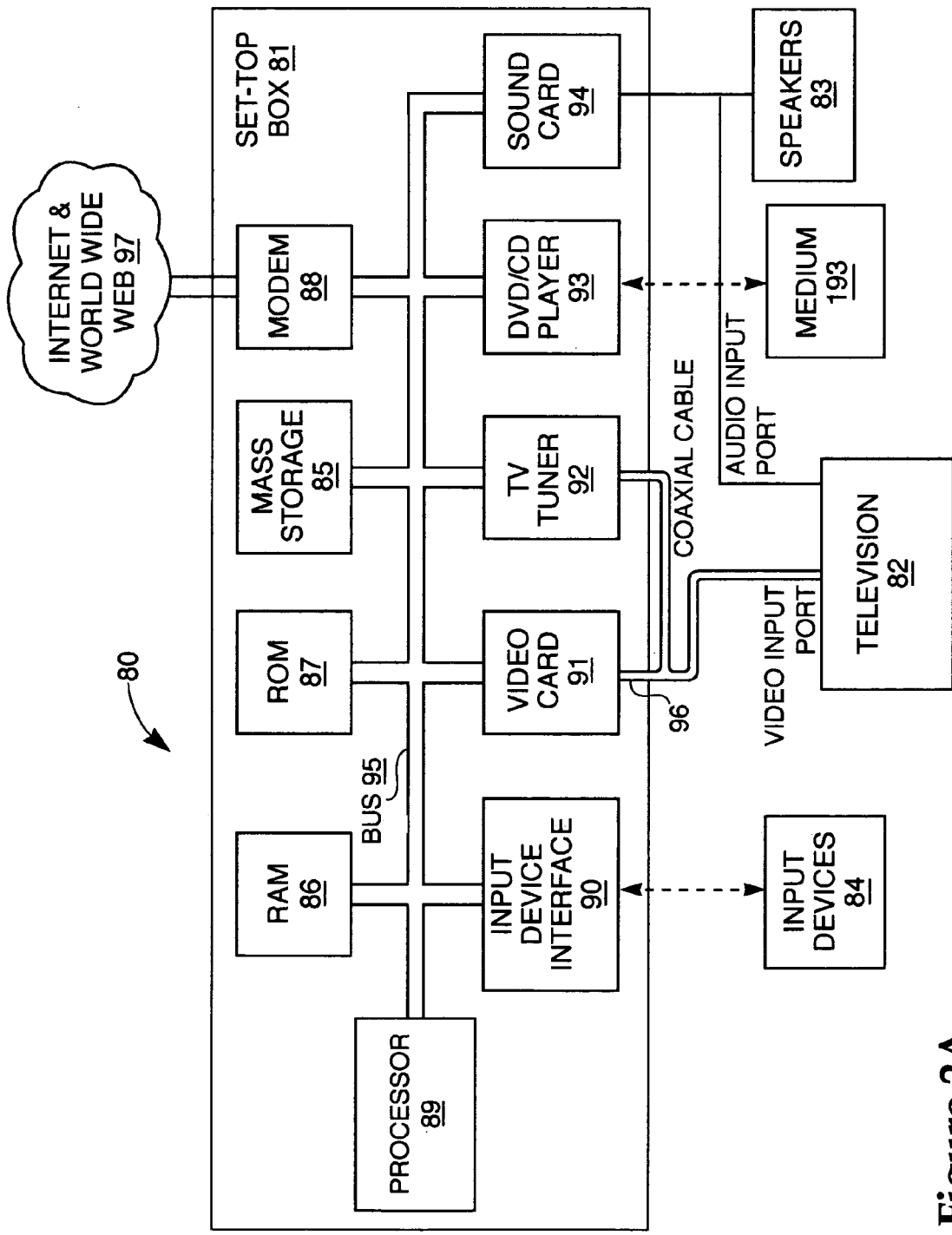
FIG. 2A is a block diagram of a multimedia system which includes a set-top box, a television, speakers, input devices, and a coaxial cable between the television and the set-top box, capable of alternative audiovisual and multimedia operation subject to mode selection.

FIG. 2A is a block diagram of a multimedia system 80 having set-top box 81, television 82, speaker or speakers 83, input devices 84, and coaxial cable 96 or other link between television 82 and set-top box 81, capable of alternative audiovisual and multimedia operation subject to mode selection methods. Set-top box 81 may include bus 95 which interconnects RAM 86, ROM 87, modem 88, processor 89, input device interface 90, video card 91, TV tuner 92, DVD/CD player 93, mass storage 85 (e.g., hard drive) and sound card 94. Video card 91 and TV tuner 92 may be connected by coaxial cable 92 with a video input port of television 82. Sound card 94 may be connected to an audio input port of television 82.

As discussed above, input devices 84 may include remote control devices such as a TV type remote control device and may typically be of the infrared or RF type remote control type. Input device interface 90 may comprise a infrared to USB signal converter. Input device interface 90 may receive remote control signals, and, depending upon context of use (as previously discussed) convert these signals to USB signals for controlling a particular device. Thus, an infrared signal for the numeral "2" would remain the same regardless of whether such a signal was intended to change a television channel, select DVD track, dial a phone number, or type the number "2" in an e-mail message. Input device interface 90 (and/or software relating thereto) may receive such a signal, and, cognizant of the context of the signal (i.e., which application is running in the foreground) generate the appropriate USB signal to control or communicate with the appropriate device in the system.

Note also that bus 95 may represent one or more physical busses within set-top box 81. Set-top box 81 may include, for example, a universal serial bus (USB) for communicating between peripheral devices. Other system buses (e.g., P-bus, ISA bus, or the like) may interface with the USB and processor 89 and other system resources (e.g., RAM 86 and ROM 87). Such a bus structure is known in the computer art and may be applied here without departing from the spirit and scope of the present invention.

One or more input devices 84, including but not limited to, a keyboard, mouse, or remote control input device, may be coupled hard-wired or wireless signal communication with input device interface 90. Modem 88 may connect set-top box 80 to the Internet and World Wide Web 97.

Processor 89 may comprise, for example, a Pentium™ class processor manufactured by Intel Corporation. Construction of such a Pentium™ class PC architecture is known to those of ordinary skill in the art. In order to reduce cost for the consumer market, however, many "legacy" features and connectors of a traditional PC may not be implemented in set-top box 81 of FIG. 2A. Moreover, the overall appearance and configuration of the set-top box 81 may be more akin to a consumer electronic device (e.g., VCR, DVD player) than a personal computer.

Figure 2B:
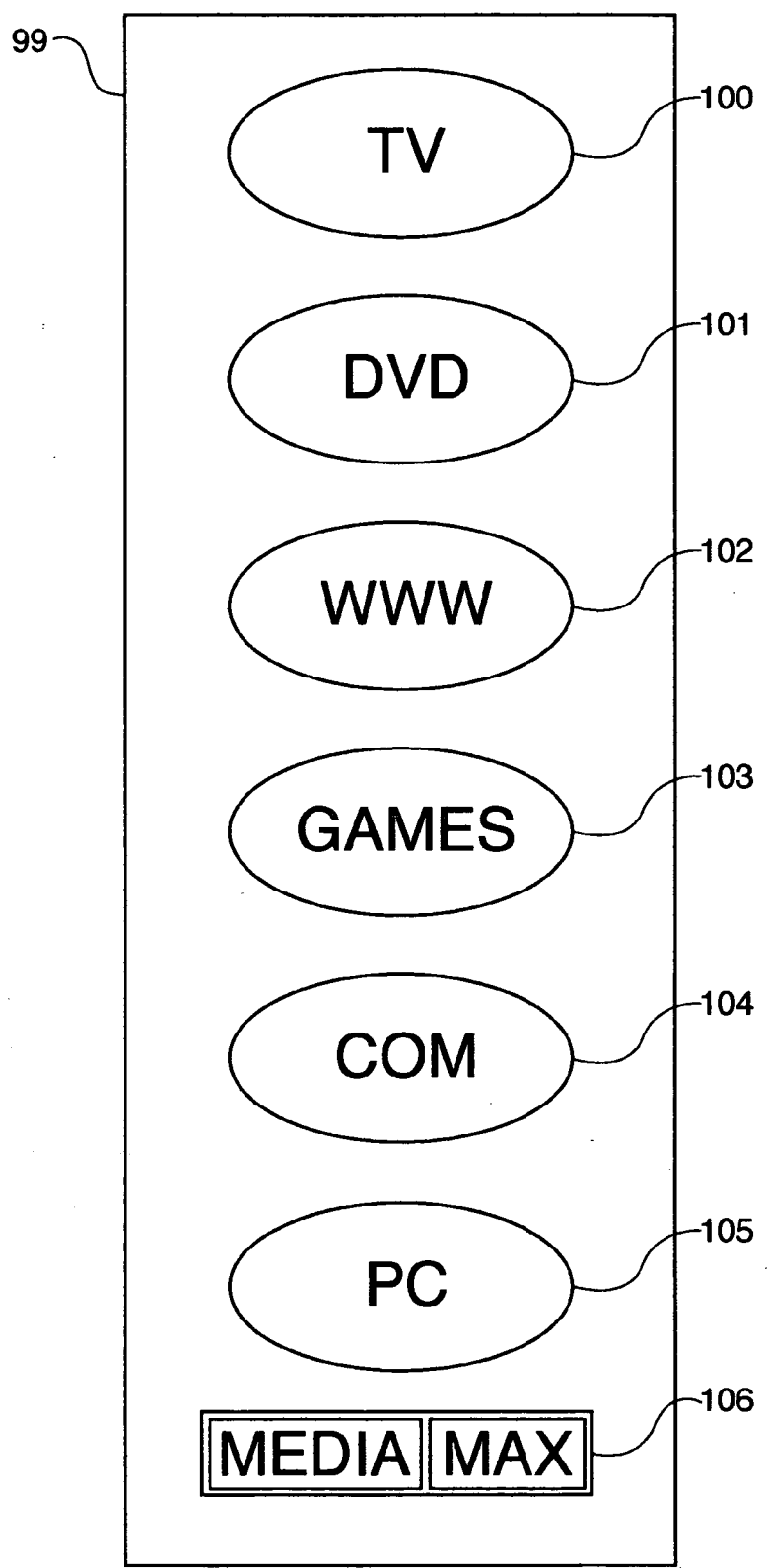
FIG. 2B is a diagram of an opening screen menu for a mode selection user interface, as it appears on a television screen to permit a simple presentation of user multimedia mode selection options.

FIG. 2B is an opening screen main menu user interface 94 which may appears on the television screen to permit simple non-Window presentation of user mode selection options. In particular, main menu 99 shows button or actuation fields for selection of operational modes: TV 100, DVD 101, world wide web (WWW) 102, games 103, communication 104, PC operation, and multimedia or audiovisual modes 106. By positioning the cursor over the particular desired button and making a mouse click or double-click, or by actuating the desired button with another input device such as a remote control, a desired multimedia mode may be selected.

Figure 3:
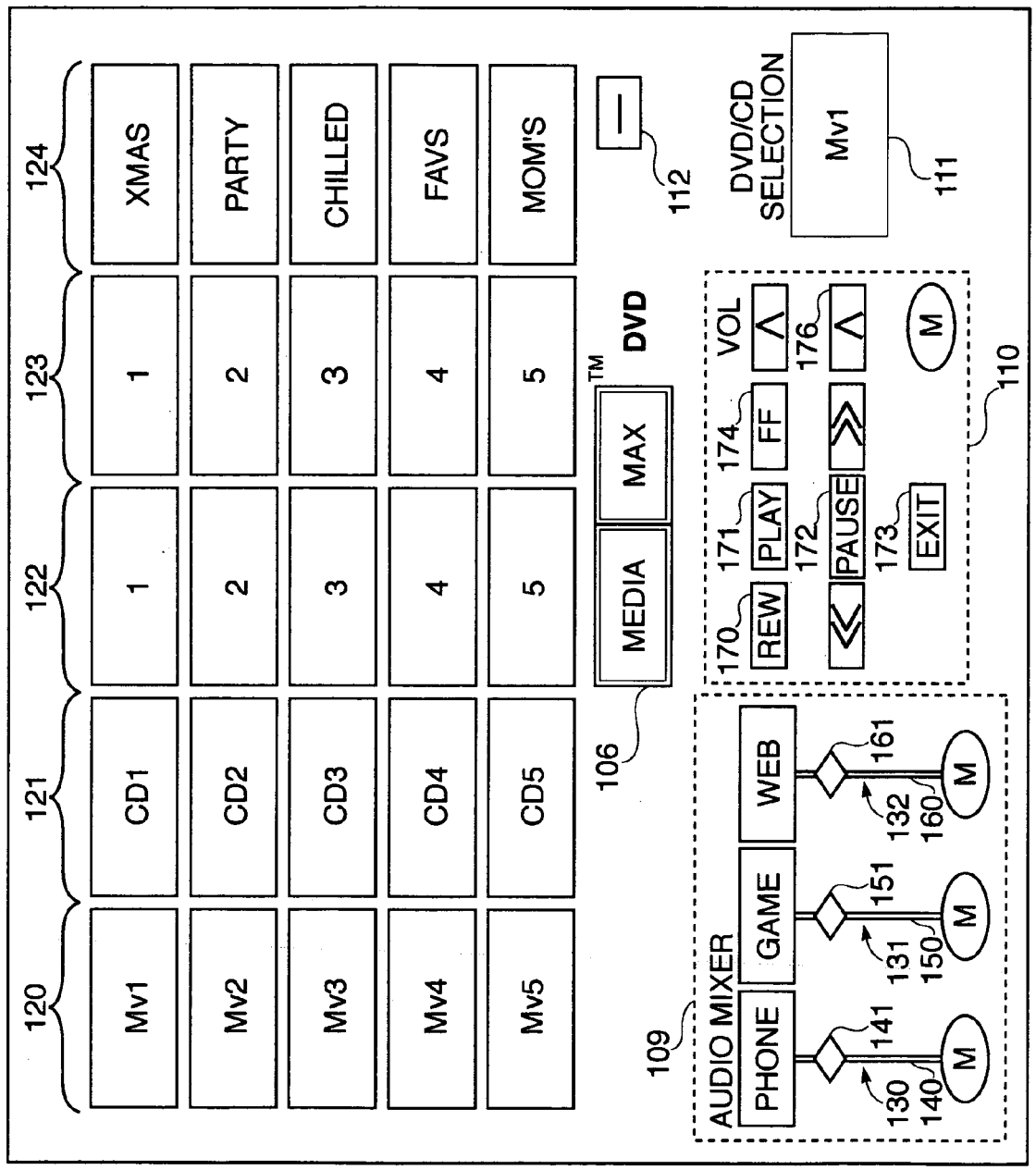
FIG. 3 is a diagram of a digital video disk audio control display arrangement.

FIG. 3 is a digital video audio control display a for a user interface. In particular, the display shows a window including audio mixer control fields 109, DVD control fields 110, a DVD/CD selection field 111, and a plurality of other predetermined mode specific control fields 120–124. Control fields 120 permit selection of DVD content, and control fields 121 permit selection of CD content.

Audio mixer 109 may have a telephone volume setting system 130, game volume setting system 131, and web volume setting system 132. Telephone volume may be settable along control bar 140. Game volume may settable along control bar 141. Web volume may be settable along control bar 160. DVD and CD settings include rewind 170, play 171, pause 172, exit 173, fast forward 174, and volume 176.

Figure 4:
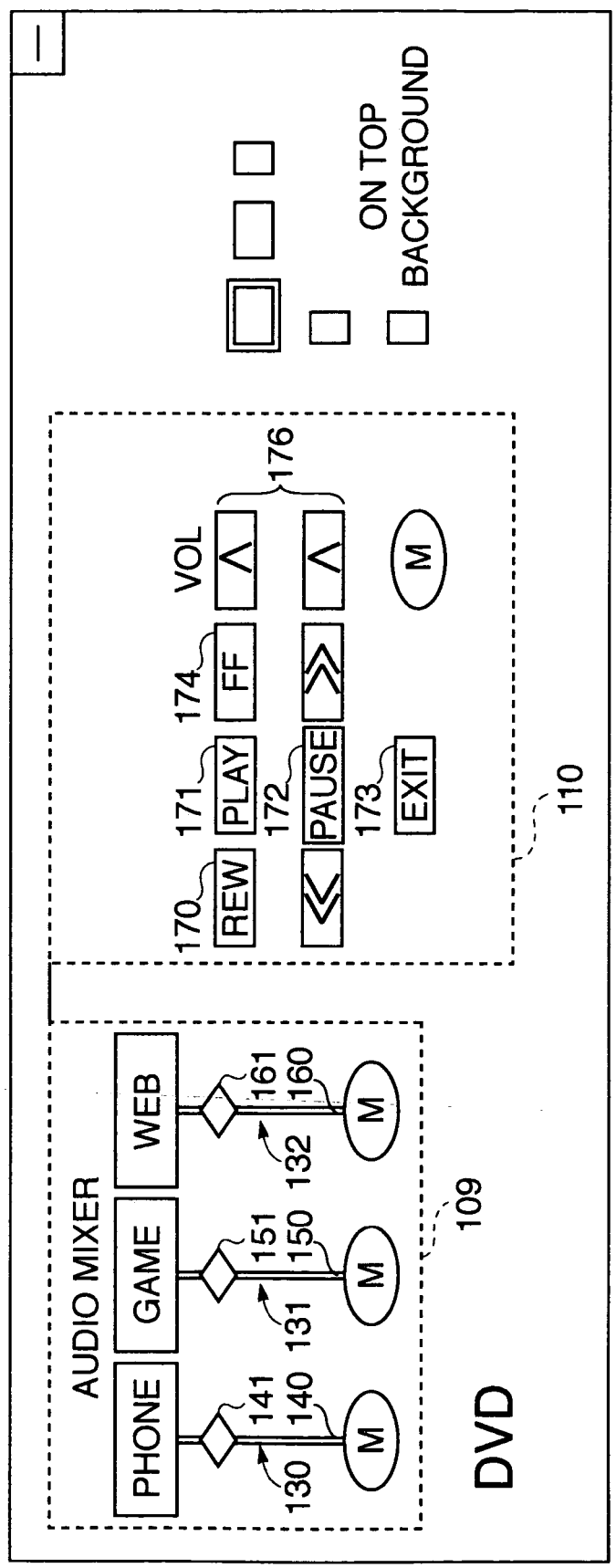
FIG. 4 is a diagram of digital video audio disk control display arrangement.

FIG. 4 is a digital video audio control display for a user interface. In particular, the display shows a window including audio mixer control fields 109 and DVD control fields 110. Audio mixer 109 may have telephone volume setting system 130, game volume setting system 131, and web volume setting system 132. Telephone volume may be settable along control bar 140. Game volume may be settable along control bar 141. Web volume may be settable along control bar 160. DVD and CD settings include rewind 170, play 171, pause 172, exit 173, fast forward 174, and volume 176.

Figure 5:
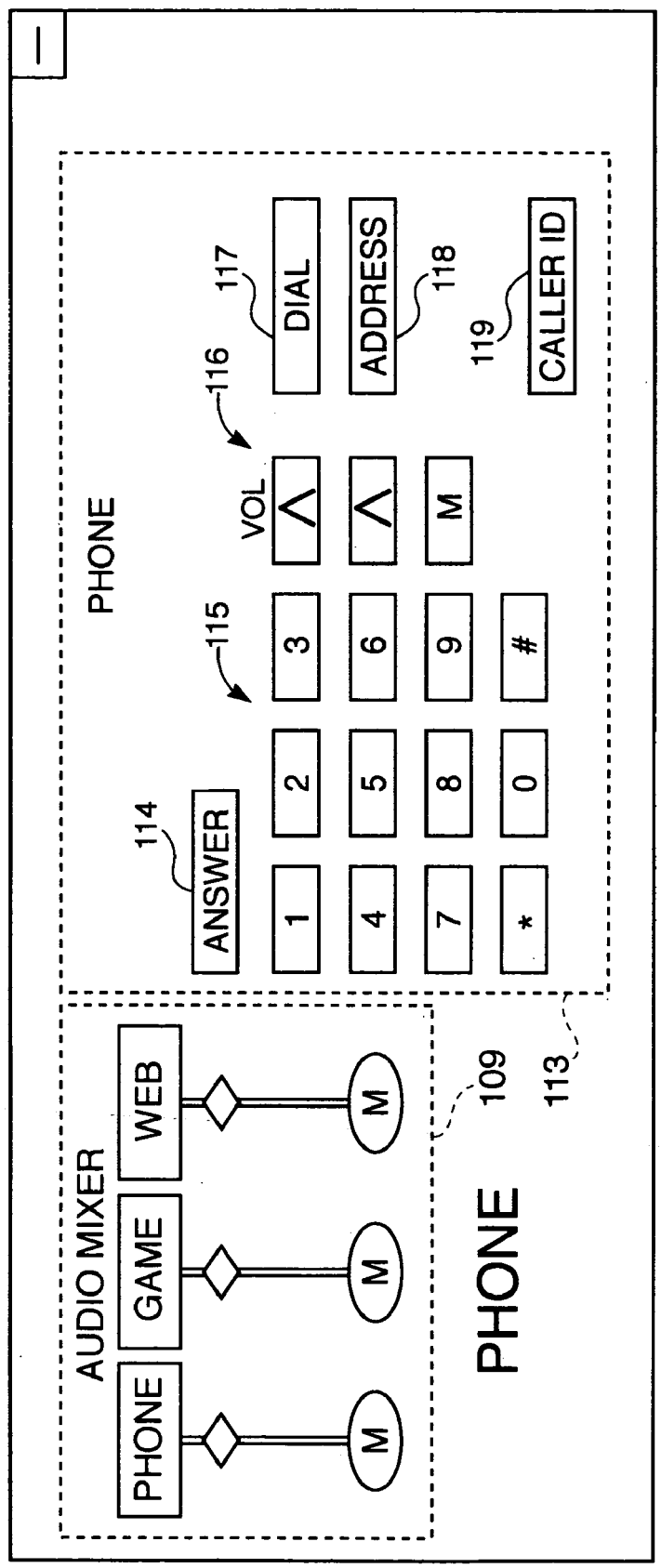
FIG. 5 is a diagram of telephone control display on a user interface.

FIG. 5 is a telephone control display for a user interface. In particular, the display shows a window including audio mixer control fields 109 and telephone control fields 113 including an answer button 114, number buttons 115, volume setting buttons 116, dial button 117, address button 118, and caller ID button 119. Using the remote control, a user may use the set-top box 81 to make and receive telephone calls, either through ordinary phone connections, or through the internet and the like.

Figure 6:
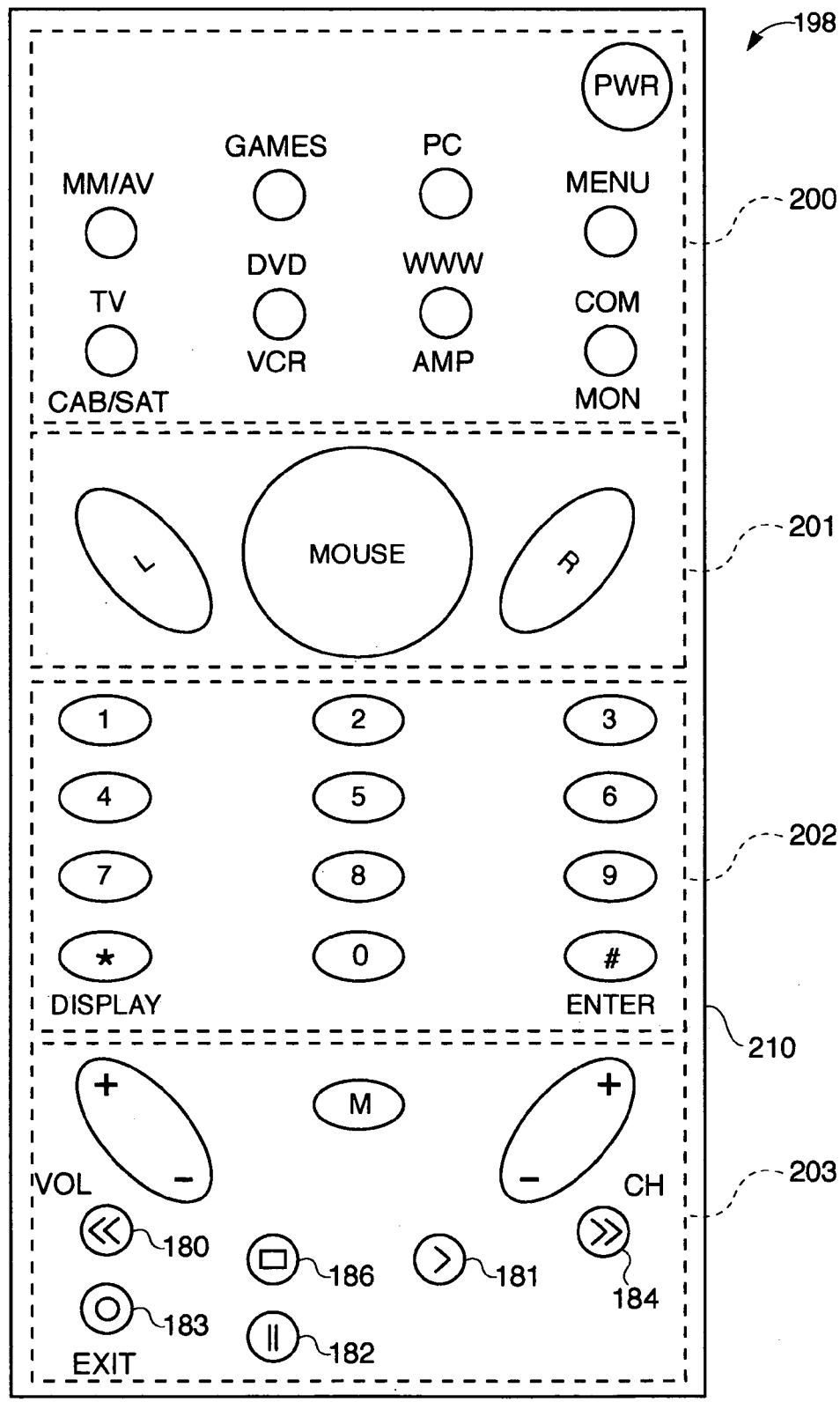
FIG. 6 is a schematic diagram of an arrangement of control fields for a remote control input device representation on a user interface screen.

FIG. 6 is a schematic diagram of an arrangement of control fields for a remote control input device or an emulation representation 198 thereof. The control input device representation 198 includes a window 210 including predetermined control fields 200, mouse buttons 201, number character fields 202, and volume and channel control keys 203. Control keys 200 include buttons for actuating power, selection of MM/AV modes, games, PC, TV, DVD, VCR, world wide web, menu selection, and communication activities. Channel keys 203 include selection buttons for volume and channel navigation as well as fast reverse 180, play 181, stop 182, fast forward 184, and pause 186.

User interfaces are not new to computers and even in some cases to consumer devices. The objective of the user interface of the present invention is to offer the functionality, and concurrency capability of a computer while hiding the complexities of the operating system, applications and of the hardware.

The user interface of the present invention does much more than enable a user to select which tasks to run and see if there is a conflict. It enables a user to use the computer while maximizing the intended functionality.

For example, in a typical Windows environment, the user interface enables applications to be grouped and launched just like the user interface of the present invention. However, the user interface (UI) of the present invention also performs the following tasks. Once an application is launched, the UI detects if the application has a resource conflict with another application and then either prompts the user for a choice to kill the first application or the new application. It does this in case of launching a speakerphone/telephony application if the WEB is already running, and only in the case where there is a resource conflict. The same is true for watching DVD or input from a TV Tuner.

The present invention may also enable better use of the hardware based on the application being launched. For example, when launching DVD, the UI will automatically switch video ports to give a better quality output to a TV by leveraging some special hardware in the video out chip and only if a user is connected to a TV. If the user is not connected to a TV, the UI, it would not do this. Once the application is stopped, the user interface automatically switches back to the standard VGA mode to enable the UI to be displayed again.

Additionally, the UI is used to switch back and forth between applications which are either running or to launch new applications. In a Windows environment, a user may launch applications by selecting the application through the start menu. A user may also check to see which applications are running by hitting CTRL-ESC. Then the user may switch to one of the running applications by holding down the alt key and continuously hitting the tab key to cycle through the applications. However, all of these require separate multiple keys to perform or require a keyboard. This is possible to do with just a mouse.

In the UI of the present invention, is a user wants to watch a DVD movie and then a call comes in, the user may hit the menu key to go to the UI, then select the telephony application. If the application is already loaded and running in the background, the UI knows this and becomes a context manager to switch applications. If the application is not loaded, it launches the application in time to answer the call. Then the user may then use the Menu key to go back to watching the movie. If the user happens to be watching the movie in the special DVD movie hi-res mode only, it also switches video ports to enable the menu to be displayed in VGA mode and then switch back to Video out mode to watch the movie.

Finally, one important feature of the UI of the present invention is the ability for the remote to pick up the characteristics of the application which is running via the UI. For example, on a typical universal remote control, if a user presses the DVD buttons, then the remote's fast forward, stop, play, rewind buttons are mapped to the DVD player. The user switches to CD by pressing the CD button, and then the buttons are mapped to a particular device.

In the present invention, the remote control commands are dependent on which application is the foreground application running. The UI senses a button has been pressed such as the number 1, and if a telephony application is the foreground application, then the number 1 is dialed. If DVD is the foreground application running, then the 1st chapter of the movie is loaded. If the CD-Audio player is playing a music disc, then the first track is loaded. All this is automatically handled by the UI without having the user have to press a particular button on the remote to enable a function change.

RC Launch is a user interface which intelligently re-maps the function of the remote control based on the active application. This re-mapping occurs automatically without requiring the user to select a desired functionality from the remote or to switch devices using special function keys as is typical on universal remotes.

Once RC Launch is running, all remote control button presses are captured. When a RC Launch button press occur, the program "wakes up" and goes through the following steps to process the button message. First, it checks if the application is registered by RC Launch. If it is, it checks if there is any application specific mappings for this button. If there are it executes the action list. Otherwise, it checks if there is any default button mappings. If there is, then it executes the action list. If there is not, it returns to the "waiting for button press" state.

RC Launch also uses a remote control menu button to display the user interface. Once the user interface is displayed, the user may launch any registered application, return to any running registered application, or switch to any running application by using the remote control. Normally, the user interface will always be displayed unless the user selects the PC button which will hide the custom user interface. Thus, the system will display the standard Windows desktop.

While the preferred embodiment and various alternative embodiments of the invention have been disclosed and described in detail herein, it may be apparent to those skilled in the art that various changes in form and detail may be made therein without departing from the spirit and scope thereof.

We claim:

1. A user interface for use with a computer system, said user interface comprising:
    selecting means for selecting from a list of predetermined computer applications and outputting a selection signal;
    a conflict map containing a list of conflicts between the list of predetermined computer applications; and
    conflict checking means, coupled to the selecting means and the conflict map, for receiving the selection signal, determining from the selection signal and the conflict map whether a potential conflict between computer applications could occur, and outputting a display message if a determination is made that a potential conflict could occur between computer applications.

2. The user interface of claim 1, wherein said selecting means comprises a remote control, said user interface further comprises:
    an input device interface, for receiving signals from the remote control and converting the signals from the remote control into command signals.

3. The user interface of claim 2, wherein said remote control comprises an infrared remote control and said input device interface further comprises:
    converting means for converting infrared remote control signals to USB signals, said converting means receiving an infrared remote control signal, determining context of use of the infrared remote control signal, and generating a corresponding USB signal to communicate the infrared remote control signal to an intended device.

4. A method of selecting among a predetermined plurality of computer applications to run on a computer system for presentation on a display screen, comprising the steps of:
    selecting from a list of predetermined computer applications and outputting a selection signal,
    receiving the selection signal and determining from the selection signal and a conflict map containing a list of conflicts between the list of predetermined computer applications whether a potential conflict could occur, and
    outputting a display message if a determination is made that a potential conflict could occur between computer applications.

5. The method of claim 4, wherein said step of outputting a display message further comprises the step of:
    prompting a user to select another application if a determination is made that a potential conflict could occur.

6. The method according to claim 5, further comprising the steps of:
    determining whether a television or a computer monitor has been connected to the computer system, and
    selecting hardware in a video output device in the computer system to engage alternate video ports to produce an optimal quality output in response to said determining step.

7. A method for selecting one of at least two predetermined device application modes in a microprocessor controlled television set-top system, comprising the steps of:
    selecting a first device application mode from a predetermined menu of device application modes, which menu includes at least two such predetermined device application modes,
    determining whether a second of said at least two such predetermined device application modes is active,
    determining from a conflict map containing a list of device conflicts between the at least two predetermined device application modes whether a potential conflict could occur, and
    initiating television presentation of activities relating to said first device application mode if it is determined a potential device conflict may not occur.

8. The method according to claim 7, further comprising the step of:
    halting the second of said at least two such predetermined device application modes upon initiation of the first device application mode.

9. The method according to claim 7, further comprising the step of:
    minimizing the second of said at least two such predetermined device application modes upon initiation of the first device application mode.

10. The method according to claim 7, further comprising the step of:
    presenting images relating to the second of said at least two such predetermined device application modes in a selected window.

11. The method according to claim 10, wherein said selected window is subordinated in a web browser environment.

12. The method according to claim 11, further comprising the step of:
    presenting a control panel for setting operating parameters for the second of said at least two such predetermined device application modes within a selected window.

13. The method according to claim 7, wherein step of selecting comprises the step of selecting with a remote control device.

14. The method according to claim 7, wherein step of selecting comprises the step of selecting through an on-screen emulation of a remote control device.

15. The method according to claim 7, wherein said step of selecting is made by clicking a mouse over an active portion of a screen image of a control panel image.

16. A set-top system comprising:
   a television for producing images according to one or more application modes;
   a microprocessor device in communication with said television, said microprocessor device including circuitry for implementing at least two predetermined application modes; and
   a controller for selecting an application mode,
   wherein said device is configured to determine activation status of at least a single non-selected application mode when a particular other activation mode is selected,
   wherein said controller further comprises a selecting means for selecting from a list of predetermined applications and outputting a selection signal, and
   said controller further comprises:
      a conflict map containing a list of conflicts between the list of predetermined applications; and
      conflict checking means, coupled to the selecting means and the conflict map, for receiving the selection signal, determining from the selection signal and the conflict map whether a potential conflict could occur, and outputting a display message if a determination is made that a potential conflict could occur.

17. The set-top system of claim 16, wherein said selecting means comprises a remote control, said set-top system further comprising:
   an input device interface, for receiving signals from the remote control and converting the signals from the remote control into command signals.

18. The set-top system of claim 17, wherein said remote control comprises an infrared remote control and said input device interface further comprises:
   converting means for converting infrared remote control signals to USB signals, said converting means receiving an infrared remote control signal, determining context of use of the infrared remote control signal, and generating a corresponding USB signal to communicate the infrared remote control signal to an intended device.

19. A computer readable computer program product expressed in a selected computer readable medium, comprising:
   a first computer code portion for selecting a first device application mode from a predetermined menu of device application modes, which menu includes at least two such predetermined device application modes;
   a second computer code portion for determining whether a second of said at least two such predetermined device application modes is active; and
   a third computer code mechanism for determining from a conflict map containing a list of device conflicts between the at least two predetermined device application modes whether a potential conflict could occur, and
   a third computer code portion for initiating television presentation of activities relating to said first device application mode if it is determined a potential device conflict may not occur.

* * * * *